Aug. 3, 1965 E. E. TRIMBUR II 3,198,648

ELECTROSTATIC RECORDING METHOD

Filed Nov. 30, 1961

INVENTOR.
ERNEST E. TRIMBUR II

BY Samuel Kane

ATTORNEY

United States Patent Office 3,198,648

Patented Aug. 3, 1965

3,198,648

ELECTROSTATIC RECORDING METHOD

Ernest E. Trimbur II, Malvern, Pa., assignor to Burroughs Corporation, Detroit, Mich., a corporation of Michigan Filed Nov. 30, 1961, Ser. No. 156,063
1 Claim. (Cl. 117—17.5)

This invention relates generally to electrostatic printing and more particularly to methods of printing electrostatically on one record medium and transferring the printed information to another record medium.

In the electrostatic printing art, it has been customary to print on a special type of record medium composed of a layer of dielectric material bonded to an electrically conductive paper backing. This type of record medium has been relatively expensive.

An object of the invention, therefore, is to minimize the cost of electrostatic recording by providing a method of recording which will combine the high speed characteristics of electrostatic recording with the economy of using ordinary paper or card stock as a record medium.

Another object of the invention is to provide an improved electrostatic printing method.

In accordance with the above objects and first considered briefly in its broad aspects, the invention comprises a method of obtaining a master record of electrostatically recorded information, developing the master record medium with dry solid pigmented ink particles to render the electrostatic image visible, and transferring the inked image to another record medium by the application of force.

The invention will be more clearly understood when the following detailed description thereof is read in conjunction with the accompanying drawings, in which.

Figure 1:
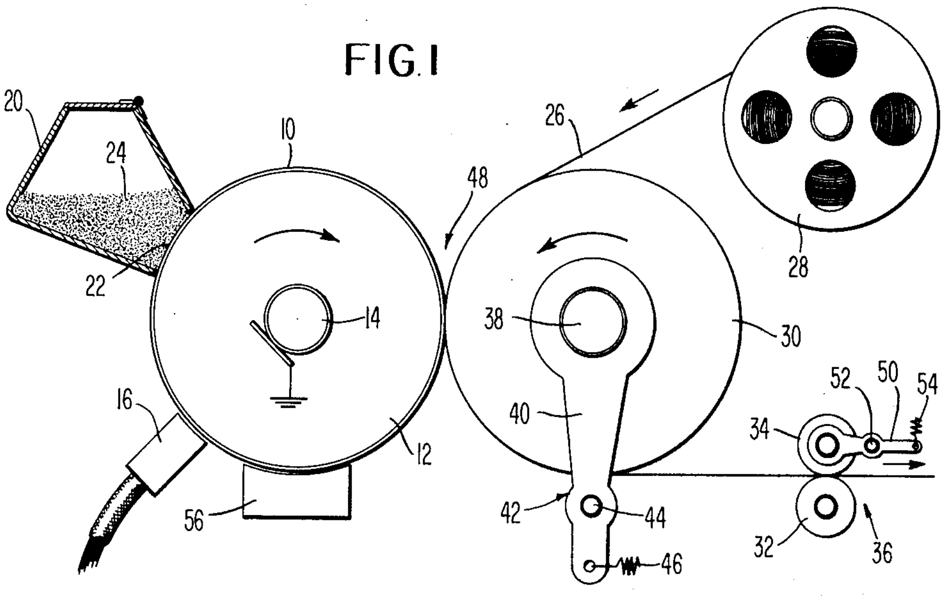
FIG. 1 is a diagrammatic illustration of an apparatus embodying principles of the invention.
Figure 3:
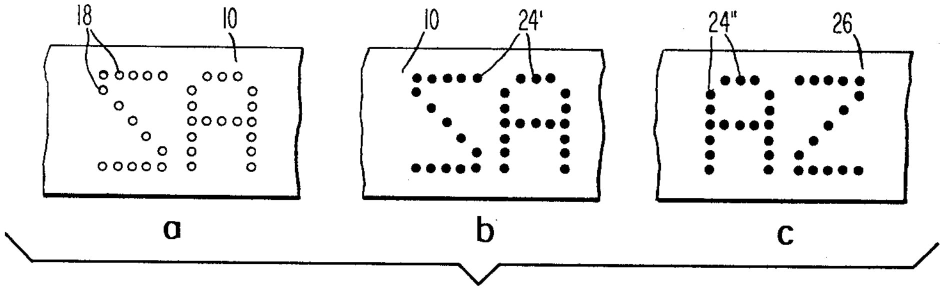
FIG. 3 illustrates successive steps in the process of printing and inking the master record medium and of transferring the inked image from the master record medium to another record medium.

Turning now to the detailed description and to the accompanying drawings, the preferred embodiment of apparatus for practicing the invention is illustrated in FIG. 1 and comprises a master record strip in the form of an endless band 10 of dielectric material, which may be coated, bonded or otherwise supported on an electrically conductive roller 12, the latter connected to ground through its shaft 14 and constituting the back electrode for an accompanying print head 16. The print head 16 may, for example, be of the kind shown in U.S. Patent 2,955,894, in which case it would contain a matrix of pin electrodes, not shown, each pin electrode adapted to be energized for printing or impressing a latent electrostatic charge 18 (FIG. 3*a*) on the outer surface of the dielectric band 10 in accordance with predetermined patterns. For purposes of illustration, the patterns of charges 18 shown in FIG. 3*a* are formed for recording the characters or letters "A" and "Z," with each charge 18, while actually invisible, being shown as a visible circular region.

Adjacent to the roller 12 is a container 20 provided with a discharge opening 22 for supplying developer to the surface of the dielectric band 10 in the form of finely divided electrically conductive pigmented ink particles 24 in dry powder form.

A record medium 26, illustrated here in the form of a web, and preferably of ordinary dry paper or card stock is paid out or fed from a supply reel 28 in a manner to be described hereinafter, passes about a pressure roller 30, and then passes between rollers 32 and 34 of a pressure-fixing station 36 toward its destination.

The roller 12 and the pressure roller 30 are mounted for relative movement, with the roller 12 preferably mounted for rotation on a fixed axis and the roller 30 preferably mounted for rotation on a movable axis. In the present embodiment, the roller 30 is provided with an integral shaft 38 which is journalled for rotation in the upper bifurcated arm 40 of a rock lever 42 pivotally mounted on a fixed pin 44. A force-applying means, illustrated here in the form of a tension spring 46, urges the rock lever 42 in a counterclockwise direction to force the pressure roller 30 against the web 26, and the web in turn against the dielectric band 10.

In operation, the roller 12 is rotated by its shaft 14 from a suitable source of power, not shown, to advance the master record or dielectric band 10 past the print head 16, where the dielectric band receives electrostatic printing in the form of the charges 18, and thence past the container 20 to enable particles of ink 24 to be attracted to the charges 18 to make the latent electrostatic image visible, as depicted in FIG. 3*b*. The darkened spots, or region 24', indicate the adhesion of ink particles 24 to the latent electrostatic charges 18.

Roller 12 rotates the pressure roller 30, by reason of the force with which the latter roller is being urged leftwardly by the spring 46, and thereby feeds the record web 26 from the supply reel 28. If desired, the pressure roller 30 may be rotated by a separate power drive, in which case it would be rotated in timed relation with the roller 12.

As the inked region of the dielectric band 10 (FIG. 3*b*) passes through the bite 48 of the rollers 12 and 30, the particles of adhered ink 24' will be forced from the band 10 onto or into the surface of the record web 26 to form the transferred characters, as depicted in FIG. 3*c* in which the transferred ink particles are designated by the numeral 24''. In this connection, it is too be noted that in order to preserve the condition of the dielectric band 10, and to extend its life, the force of the spring 46 should be little more than sufficient to transfer the ink particles from the dielectric band 10 to the record web 26. It is preferable next to fix the transferred printing on the record web 26 and this may be done, as shown, by passing the record web between the roller 32 which is mounted for rotation on a fixed axis and the cooperating pressure roller 34 which is rotatably mounted on a rock lever 50. The rock lever 50 is pivotally mounted on a fixed pin 52 and is urged counterclockwise by a tension spring 54 to press the roller 34 toward the roller 32 with a greater force than the force applied to the pressure roller 30 by the tension spring 46.

It has been found that the solid ink particles 24' transfer satisfactorily from the dielectric band 10 to the record web 26 when the dielectric band is constructed of a smoother, harder material than the record web, and when the record web has a tooth characteristic of greater ink holding force than the combined ink holding force of the tooth characteristic of the dielectric band and the electrostatic charges 18 thereon. The expression "tooth characteristic" refers to the minute or microscopic projections on the surface of a material, which are herein designated "teeth." It is believed that the ink particles 24' attached to such teeth on the record web 26 when subjected, as described, to an appropriate force between the roller 12 and the pressure roller 30.

To condition the dielectric band 10 for receiving new printing from the print head 16, an erase head 56 is actuated to remove the electrostatic charges 18 from the dielectric band 10, or to otherwise electrically neutralize these charges.

Figure 2:
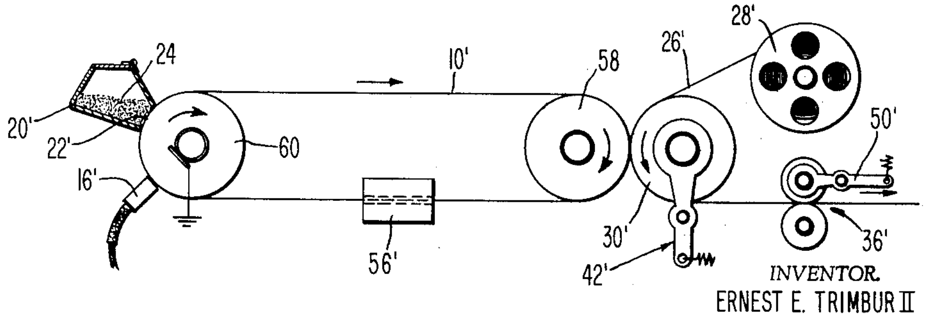
FIG. 2 shows a modification.

In FIG. 2 is shown a modification of the apparatus of FIG. 1 in which the master record takes the form of an elongated endless dielectric band or belt 10' mounted for rotation on a roller 58 and a back electrode roller 60. In this embodiment, the dielectric belt 10' preferably passes through the erase head 56', as shown.

What is claimed is:

A method of recording information which utilizes an endless band of dielectric material conditioned with electrostatic charges and a dry paper record medium which is softer and rougher than the dielectric material and has a tooth characteristic of greater ink holding force than the combined ink holding force of the tooth characteristic of the endless band and the electrostatic charges thereon, and which comprises:

(a) rotating said endless band of dielectric material past an electrostatic printing station and impressing thereon said electrostatic charges representative of information, (b) developing the latent electrostatic image by applying electrically conductive dry pigmented ink in powder form to the electrostatic charges on said endless band, (c) pressing said dry paper record medium against the rotating endless band with such force as to effectuate a transfer of said pigmented ink from the endless band to said record medium, by reason of the tooth characteristic of the record medium, the characteristics of the ink, and the characteristics of the electrostatically charged endless band of dielectric material, (d) applying additional pressure of a greater magnitude than the transfer pressure to the inked surface of said dry paper record medium to permanently fix the ink particles thereto, and (e) electrically neutralizing the electrostatically charged regions of said endless band subsequent to said transfer of pigmented ink to said dry paper record medium.

References Cited by the Examiner

UNITED STATES PATENTS

| | | | |
|---|---|---|---|
| 2,624,652 | 1/53 | Carlson | 117—17.5 X |
| 2,777,745 | 1/57 | McNaney | 117—17.5 |
| 2,807,233 | 9/57 | Fitch | 118—637 |
| 2,855,324 | 10/58 | Van Dorn | 117—17.5 X |
| 2,857,290 | 10/58 | Bolton | 117—17.5 |
| 2,919,672 | 1/60 | Benn et al. | 117—17.5 X |
| 2,955,894 | 10/60 | Epstein | 117—17.5 X |
| 2,990,278 | 6/61 | Carlson | 118—637 X |
| 3,094,429 | 6/63 | Howell | 118—637 X |
| 3,108,895 | 10/63 | Howell | 117—17.5 X |

WILLIAM D. MARTIN, *Primary Examiner.*